US007268172B2

(12) United States Patent
Bach et al.

(10) Patent No.: US 7,268,172 B2
(45) Date of Patent: Sep. 11, 2007

(54) RADIATION CURABLE COMPOSITIONS

(75) Inventors: Hermann Bach, Mt. Lebanon, PA (US); Roy B. Clemens, Moon Township, PA (US); Larry Galeza, Mercer, PA (US); Charles A. Gambino, McDonald, PA (US); Scott A. Grace, Moon Township, PA (US); Michael Dvorchak, Monroeville, PA (US); Ramesh Subramanian, Coraopolis, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 161 days.

(21) Appl. No.: 10/966,790

(22) Filed: Oct. 15, 2004

(65) Prior Publication Data

US 2006/0084713 A1    Apr. 20, 2006

(51) Int. Cl.
*C08F 2/50* (2006.01)
(52) U.S. Cl. .................. 522/92; 522/104; 522/107; 522/106; 522/97; 522/109; 522/100; 522/103; 522/110; 522/111; 522/112; 522/170; 522/173; 522/174; 522/178; 522/181; 522/182; 427/508; 427/517; 428/411.1
(58) Field of Classification Search ............. 522/90, 522/92, 97, 109, 100, 103, 102, 110, 111, 522/112, 170, 173, 174, 178, 181, 182; 427/508, 427/517; 428/411.1
See application file for complete search history.

(56) References Cited

U.S. PATENT DOCUMENTS

| 4,239,866 A * | 12/1980 | Reitel et al. ................. 525/440 |
| 4,271,258 A | 6/1981 | Watariguchi ................. 430/284 |
| 4,303,696 A * | 12/1981 | Brack .......................... 427/503 |
| 4,380,604 A | 4/1983 | Neuhaus et al. ............. 524/873 |
| 4,937,173 A | 6/1990 | Kanda et al. ................. 430/281 |
| 5,013,631 A | 5/1991 | Su ................................ 430/271 |
| 5,213,875 A | 5/1993 | Su et al. ...................... 428/209 |
| 5,362,773 A | 11/1994 | Brindoepke et al. ........ 523/415 |
| 5,470,689 A * | 11/1995 | Wolf et al. ................... 430/269 |
| 5,684,081 A | 11/1997 | Dannhorn et al. ........... 524/507 |
| 5,726,255 A | 3/1998 | Melxner et al. .............. 525/438 |
| 5,756,829 A | 5/1998 | Melxner et al. .............. 560/209 |
| 6,011,078 A | 1/2000 | Reich et al. ................... 522/86 |
| 6,232,360 B1 | 5/2001 | Melxner et al. ............... 522/43 |
| 6,261,645 B1 | 7/2001 | Betz et al. .................... 427/500 |
| RE37,448 E | 11/2001 | Melxner et al. .............. 525/438 |
| 6,359,082 B1 | 3/2002 | Meixner ....................... 525/531 |
| 6,479,577 B1 | 11/2002 | Paulus et al. ................ 524/507 |
| 6,509,389 B1 | 1/2003 | Krohn .......................... 522/92 |
| 6,521,702 B1 | 2/2003 | Weikard et al. .............. 524/839 |
| 6,538,044 B2 | 3/2003 | Ledniczky et al. ............ 522/46 |
| 6,541,536 B2 | 4/2003 | Weikard et al. ................ 522/84 |
| 6,559,225 B1 | 5/2003 | Irle et al. ..................... 524/839 |
| 6,579,932 B1 | 6/2003 | Schipper et al. ............ 524/501 |
| 6,596,787 B1 * | 7/2003 | Levandoski et al. .......... 522/96 |
| 6,753,394 B2 | 6/2004 | Weikard et al. .............. 526/301 |
| 6,790,485 B2 | 9/2004 | Baumbach et al. .......... 427/508 |
| 2003/0045596 A1 | 3/2003 | Krohn .......................... 522/71 |
| 2003/0045598 A1 | 3/2003 | Chen et al. .................... 522/83 |
| 2003/0059555 A1 | 3/2003 | Fenn et al. ................... 427/558 |

FOREIGN PATENT DOCUMENTS

WO     01/74499 A1     10/2001

* cited by examiner

*Primary Examiner*—Sanza L. McClendon
(74) *Attorney, Agent, or Firm*—Joseph C. Gil; Robert S. Klemz

(57) ABSTRACT

The present invention is directed to a composition curable by radiation having a wavelength of 300 nm or more, a method of producing a coated substrate using such composition and the coated product so-produced. More particularly, the composition of the present invention comprises A) from about 1 to about 99% by weight of an unsaturated polymer or oligomer, B) from about 1 to about 99% by weight of an unsaturated epoxy acrylate, C) one or more photoinitiators, and, optionally, D) one or more solvents.

15 Claims, No Drawings

RADIATION CURABLE COMPOSITIONS

BACKGROUND OF THE INVENTION

UV curable coatings are one of the fastest growing sectors in the coatings industry. In recent years, UV technology has made inroads into a number of market segments like fiber optics, optical- and pressure sensitive adhesives, automotive applications like UV cured topcoats, and UV curable powder coatings. The driving force of this development is mostly the quest for an increase in productivity of the coating and curing process. In automotive refinish applications where minor repairs need to be performed swiftly and at ambient temperature, UV technology promises to significantly increase the throughput of cars in a body shop. The development of refinish applications breaks new ground in UV technology. Safety concerns associated with the use of UV lamps in body shops as well as economic constraints will likely preclude the use of high intensity light sources. Relatively inexpensive low intensity lamps that emit only in the UV-A region of the electromagnetic spectrum are taking their place thus posing new challenges to resin developers and formulators.

UV curable coating compositions are known in the art. U.S. Pat. No. 5,684,081 describes a radiation-curable, aqueous dispersion, although the reference is silent as to the wavelength of the radiation to be used. Also known are compositions that are curable using UV radiation having a very low UV-B content and substantially no UV-C content (see, e.g., U.S. Patent application publication 2003/0059555 and U.S. Pat. No. 6,538,044). The compositions described in the '044 patent are fragranced lacquer coatings that are non-aqueous and are not based on urethane chemistry. The '555 publication describes solvent-based compositions useful as primers. The compositions therein are non-aqueous and require wiping of the coating with an organic solvent following exposure to UV radiation and before sanding of the coated part.

U.S. Pat. No. 6,559,225 describes an aqueous polyurethane dispersion for use in lacquers and coatings. The '225 patent does not describe UV curing, and hints that the dispersions described therein can be combined with radiation-curable binders (column 5, lines 17-20). U.S. Pat. No. 6,579,932 describes an aqueous coating composition which is a mixture of a polyurethane/acrylate hybrid dispersion and a polyurethane resin with oxidative drying groups. The '932 patent does not describe UV curing.

Aqueous radiation curable dispersions are also known (see, e.g., U.S. Pat. Nos. 5,362,773, 6,011,078, 6,479,577, 6,521,702 and 6,541,536).

Non-aqueous, radiation curable compositions are also known. WO 01/74499 describes a primer composition containing one or more compounds containing two or more ethylenically unsaturated polymerizable groups per molecule. Among the compounds described are epoxy acrylates, urethane acrylates and unsaturated polyesters. The compositions described therein also require significant amounts of relatively low molecular weight materials (such as ethylhexyl acrylate and isobornyl methacrylate). The '499 publication indicates that the compositions described therein can be cured with UV radiation using UV lamps having a UV-B:UV-A ratio of 1:1 or less and substantially no UV-C content. As in the '555 publication noted above, the compositions require wiping of the coating with an organic solvent following exposure to UV radiation and before sanding of the coated part. Similar compositions are described in published U.S. patent applications US 2003/0045598 and US2003/045596, and U.S. Pat. Nos. 4,937,173, 5,013,631, 5,213,875 and 6,509,389.

Radiation curable urethane acrylates are also described in U.S. Pat. Nos. 4,380,604, 6,232,360, 6,753,394 and 6,790,485. Finally, radiation curable epoxy acrylates are described in U.S. Pat. Nos. 5,726,255, 5,756,829, 6,359,082 and RE 37,448.

Compositions have now been discovered which can be cured with radiation having a wavelength of at least 300 nm and preferably from 320 nm to 450 nm.

DESCRIPTION OF THE INVENTION

More particularly, the present invention is directed to a composition curable by radiation having a wavelength of 300 nm or more, and preferably radiation having a wavelength of from about 320 nm to about 450 nm. The compositions of the invention do not require a solvent wipe and can be sanded immediately after exposure to the radiation. Furthermore, compositions of the invention can be used as primers, sealers, fillers, putties and top coatings on a variety of different substrates, such as metal, wood, cork, plastic, leather, textiles, felt, glass, paper, mineral or composite substrates.

The compositions of the present invention are non-aqueous compositions, which contain no ethylenically unsaturated monomer, and which comprise A) from about 1 to about 99% by weight, preferably from about 10 to about 90% by weight, and most preferably from about 25 to about 75% by weight, of an unsaturated (meth)acrylate polymer or oligomer selected from the group consisting:

a) an unsaturated urethane (meth)acrylate polymer or oligomer, which has an isocyanate group content of 1% by weight or less and is prepared by reacting:

ai) one or more organic polyisocyanates, and aii) an unsaturated (meth)acrylate selected from the group consisting of 1) from 0 to 100% by weight of an unsaturated polyether (meth)acrylate polyol having an OH number of from about 30 to about 500 (preferably from about 100 to about 400 and most preferably from about 200 to about 300), and prepared by reacting a polyether di- or polyol with acrylic and/or methacrylic acid, and 2) from 0 to about 100% by weight of a mono-, di-, tri- or poly-hydroxyl-$C_{10}$-$C_{10}$-alkyl or $C_6$-$C_{10}$-aryl (meth)acrylate, wherein the percents by weight of components aii)1) and aii)2) are based on the total weight of components aii)1) and aii)2 and total 100%, at an isocyanate to hydroxyl equivalent ratio of from about 0.95:1 to about 1:0.95 (and preferably about 1:1), b) an unsaturated polyether (meth)acrylate polyol having an OH number of from about 30 to about 100 (preferably from about 30 to about 70 and most preferably from about 35 to about 65), and prepared by reacting a polyether di- or polyol with acrylic and/or methacrylic acid, and c) mixtures thereof, B) from about 1 to about 99% by weight, preferably from about 10 to about 90% by weight, and most preferably from about 25 to about 75% by weight, of an unsaturated epoxy (meth)acrylate which is substantially free from epoxide groups and is prepared by reacting bi) one or more organic compounds containing at least one epoxide group and having a number average molecular weight of from about 130 to about 1000, bii) from 1.3 to 3.0 carboxy equivalents of organic dicarboxylic acid or anhydride having a number average molecular weight of from about 98 to about 166, biii) 1 hydroxy equivalent of an hydroxyl group containing reaction product, prepared at a carboxy to hydroxyl equivalent ratio of from 0.6:1 to 0.95:1 of 1) (meth)acrylic acid and 2) tri- or tetrahydroxy ether alcohols having a number average molecular weight of from about 180 to about 1000 and containing at least two ethylene and/or propylene oxide units as part of an ether structure, with the ratio of reactive equivalents of components bii) through biii) to epoxide equivalents of component bi) being at least about 1:1, C) from about 0.1 to about 10% by weight, preferably from about 0.5 to about 6% by weight, and most preferably from about 1 to about 4% by weight, of one or more photoinitiators, wherein the % by weight of component C) is based on the combined weight of components A) and B) and wherein the percentages of components A) and B) total 100%, and D) from 0 to about 90% by weight of solvent or a mixture of solvents, wherein the % by weight of component D) is based on the total combined amount of components A) and B).

Component A is an unsaturated (meth)acrylate polymer or oligomer broadly selected from the group consisting of urethane (meth)acrylates, polyether (meth)acrylates and mixtures thereof. Useful urethane (meth)acrylates are described in U.S. Pat. Nos. 4,380,604 and 6,753,394, the disclosures of which are herein incorporated by reference. Useful epoxy acrylates are described in U.S. Pat. Nos. 5,726,255, and RE 37,448, the disclosures of which are herein incorporated by reference.

As used herein the phrase "ethylenically unsaturated monomer" means a relatively low molecular weight compound having a number average molecular weight of less than about 250.

Component A

Component A) is an unsaturated (meth)acrylate polymer or oligomer selected from the group consisting of:

a) an unsaturated urethane (meth)acrylate polymer or oligomer, which has an isocyanate group content of 1% by weight or less and is prepared by reacting:

ai) one or more organic polyisocyanates, and aii) an unsaturated (meth)acrylate selected from the group consisting of 1) from 0 to 100% by weight of an unsaturated polyether (meth)acrylate polyol having an OH number of from about 30 to about 500 (preferably from about 100 to about 400 and most preferably from about 200 to about 300), and prepared by reacting a polyether di- or polyol with acrylic and/or methacrylic acid, and 2) from 0 to about 100% by weight of a mono-, di-, tri- or poly-hydroxyl-$C_1$-$C_{10}$-alkyl or $C_6$-$C_{10}$-aryl (meth)acrylate, wherein the percents by weight of components aii)1) and aii)$_2$) are based on the total weight of components aii)1) and aii)$_2$ and total 100%, at an isocyanate to hydroxyl equivalent ratio of from about 0.95:1 to about 1:0.95, b) an unsaturated polyether (meth)acrylate polyol having an OH number of from about 30 to about 100 (preferably from about 30 to about 70 and most preferably from about 35 to about 65), and prepared by reacting a polyether di- or polyol with acrylic and/or methacrylic acid, and c) mixtures thereof.

As noted above, useful urethane (meth)acrylates (A)a)) are described in U.S. Pat. Nos. 4,380,604 and 6,753,394. Such urethane (meth)acrylates are generally prepared by reacting one more polyisocyanates with an hydroxyl group-containing unsaturated (meth)acrylate.

Suitable polyisocyanates include organic polyisocyanates having aliphatically, cycloaliphatically and/or aromatically bound isocyanate groups and generally having molecular weights of from about 144 to about 1000, more preferably from about 168 to about 300. Suitable examples include butylene diisocyanate, hexamethylene diisocyanate (HTI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl) methanes ($H_{12}$MDI), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4''-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919, 218, and 4,324,879 and in European patent 798 299.

Preferably used are HDI, IPDI, TDI, $H_{12}$MDI and/or isocyanurate group-containing polyisocyanates obtained by trimerization of HDI, TDI or IPDI. Particularly preferred are HDI and IPDI and mixtures thereof.

In preparing the unsaturated urethane (meth)acrylate, the polyisocyanate is reacted at an isocyanate to OH equivalent ratio of from about 0.95:1 to about 1:0.95 (and more preferably about 1:1) with i) an unsaturated polyether (meth) acrylate having an OH number of from about 30 to about 300, ii) a mono-, di-, tri-, or polyhydroxyl $C_1$ to $C_{10}$-alkyl or $C_6$ to $C_{10}$-aryl (meth)acrylate, or iii) a mixture thereof. The resultant unsaturated urethane (meth)acrylate will have an isocyanate group content of less than 1% by weight.

Useful unsaturated polyether (meth)acrylates are prepared by reacting a polyether polyol (having an hydroxyl functionality of from 2 to 6) with acrylic and/or methacrylic acid. Suitable polyether polyols are of the type known in the polyurethane art and are generally prepared by reacting a suitable staring molecule (such as, e.g., ethylene glycol, propylene glycol, butanol, glycerol, trimethylol propane, hexane diol, pentaerythritol and the like) with ethylene oxide, propylene oxide or a mixture thereof. The polyether is then reacted with acrylic and/or methacrylic acid. When the unsaturated (meth)acrylate is to be used to prepare the unsaturated urethane (meth)acrylate), the polyether is selected so as to produce the (meth)acrylate having the required OH number and the components are reacted in amounts such that the resultant unsaturated polyether (meth) acrylate has an OH number of from about 30 to about 500, preferably from about 100 to about 400 and most preferably from about 200 to about 300. In the case where the unsaturated (meth)acrylate is to be used as an part or all of component A), the polyether is selected so as to produce the (meth)acrylate having the required OH number and the polyether and acrylic (and/or methacrylic) acid are reacted in amounts such that the resultant unsaturated polyether (meth)acrylate has an OH number of from about 30 to about 100, preferably from about 100 to about 400 and most preferably from about 200 to about 300.

Useful mono-, di-, tri-, or polyhydroxyl $C_1$ to $C_{10}$-alkyl or $C_6$ to $C_{10}$-aryl (meth)acrylates are also known in the polyurethane art. Such material are prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples include hydroxyethyl acrylate, hydroxypropyl acrylate, hydroxybutyl acrylate, hydroxypropyl acrylate, hydroxyhexyl acrylate, triglycerol diacrylate, dipentaerythritol pentaacrylate, and the corresponding methacrylates.

Component B

Component B) is an unsaturated epoxy (meth)acrylate which is substantially free from epoxide groups and is prepared by reacting
- bi) one or more organic compounds containing at least one epoxide group and having a number average molecular weight of from about 130 to about 1000,
- bii) from 1.3 to 3.0 (preferably from 1.8 to 2.2, and most preferably from 1.9 to 2.1) carboxy equivalents of organic dicarboxylic acid or anhydride having a number average molecular weight of from about 98 to about 166,
- biii) 1 hydroxy equivalent of an hydroxyl group containing reaction product, prepared at a carboxy to hydroxyl equivalent ratio of from 0.6:1 to 0.95:1 of
  1) (meth)acrylic acid and
  2) tri- or tetrahydroxy ether alcohols having a number average molecular weight of from about 180 to about 1000 and containing at least two ethylene and/or propylene oxide units as part of an ether structure, with the ratio of reactive equivalents of components bii) through biii) to epoxide equivalents of component bi) being at least about 1:1

As noted above, useful unsaturated epoxy (meth)acrylates are described in U.S. Pat. Nos. 5,726,255, 6,359,082 and RE 37,448.

The epoxy (meth)acrylate used is the present invention is prepared by reacting an organic compound(s) containing epoxide groups with bii) from 1.3 to 3.0 carboxyl equivalents of organic dicarboxylic acid or anhydride having a molecular weight from about 98 to about 166 and biii) 1 hydroxy equivalent of OH group-containing reaction products, which are prepared at a COOH/OH equivalent ratio of 0.6:1 to 0.95:1, of 1) (meth)acrylic acid and 2) tri- or tetrahydric ether alcohols having a number average molecular weight of 180 to 1000 and containing at least two ethylene and/or propylene oxide units as part of an ether structure.

Within the context of the present invention, "compounds having epoxide groups" mean organic compounds which have a number average molecular weight ($M_n$) of from about 130 to about 1000 and contain an average of at least one (preferably from 1.5 to 6 and more preferably from 1.5 to 2) epoxide groups per molecule. An "epoxide equivalent" means the amount of epoxide compounds in grams that contains one mole of epoxide groups.

Preferred compounds having epoxide groups are those having an epoxide equivalent weight of 100 to 500. Examples include polyglycidylethers of polyhydric phenols such as pyrocatechol, resorcinol, hydroquinone, 4,4'-dihydroxydiphenylmethane, 2,2-bis-(4-hydroxyphenyl)-propane (bisphenol A), 4,4'dihydroxydiphenylcyclohexane, 4,4'-dihydroxy-diphenylsulphone, tris-(4-hydroxyphenyl)-methane and novolaks (i.e., reaction products of mono- or polyhydric phenols with aldehydes, particularly formaldehyde, in the presence of acid catalysts). Polyglycidyl ethers of bisphenol A are preferred.

Also suitable are glycidyl ethers of monoalcohols such as n-butanol or 2-ethylhexanol; glycidyl ethers of polyhydric alcohols such as butane 1,4-diol, butene 1,4-diol, hexane 1,6-diol, glycerol, trimethylolpropane, pentaerythritol and polyethylene glycols; triglycidyl isocyanurate; polyglycidyl thioethers of polyhydric thiols such as bismercaptomethylbenzene; glycidyl esters of monocarboxylic acids such as versatic acid; and glycidyl esters of polyvalent, aromatic, aliphatic and cycloaliphatic carboxylic acids such as phthalic acid diglycidyl ester, isophthalic acid diglycidyl ester, terephthalic acid diglycidyl ester, tetrahydrophthalic acid diglycidyl ester, adipic acid diglycidyl ester and hexahydrophthalic acid diglycidyl ester.

Dicarboxylic acids or dicarboxylic acid anhydrides (bii)) are selected from saturated or unsaturated aliphatic dicarboxylic acids containing 4 to 10 carbon atoms such as fumaric acid, maleic acid, succinic acid, adipic acid, sebacic acid, itaconic acid and/or the corresponding anhydrides; cycloaliphatic dicarboxylic acids or dicarboxylic acid anhydrides containing 8 to 10 carbon atoms such as tetrahydrophthalic acid, hexahydrophthalic acid, norbornene dicarboxylic acid and/or anhydrides thereof; and aromatic dicarboxylic acids containing 8 carbon atoms or anhydrides thereof such as phthalic acid, phthalic acid anhydride, isophthalic acid and terephthalic acid.

Dicarboxylic anhydrides (bii)) are selected from saturated, aromatic or unsaturated (cyclo)aliphatic dicarboxylic anhydrides having 4 to 9 carbon atoms such as the anhydrides of maleic acid, succinic acid, phthalic acid, tetrahydrophthalic acid, hexahydrophthalic acid or norbornene dicarboxylic acid. In calculating the ratio of carboxy equivalents (component biii) to hydroxyl equivalent (component bii), one carboxylic anhydride group is equal to two carboxy groups.

Component biii) is selected from OH group-containing reaction products (meth)acrylic acid with tri- or tetrahydric ether alcohols having a number average molecular weight (determined by end group analysis) of 180 to 1000 and containing at least two ethylene and/or propylene oxide units as part of an ether structure. These reaction products are prepared at a COOH/OH equivalent ratio of 0.6:1 to 0.95:1, preferably 0.65:1 to 0.90:1. The ether alcohols are obtained by the alkoxylation of suitable starter molecules in known manner. Preferred starter molecules are ether group-free tri- or tetrahydric alcohols, which correspond to the ether alcohols. Examples include glycerol, trimethylolpropane, trimethylolethane, pentaerythritol and mixtures thereof. The ether alcohols preferably have a degree of alkoxylation of 2 to 20, more preferably 2 to 15. The degree of alkoxylation refers to the average number of moles of ethylene oxide and/or propylene oxide which have been added onto 1 mole of an alcohol used as starter molecule.

The reaction between the components 1) and 2) takes place according to known methods, e.g., by azeotropic esterification of (meth)acrylic acid with the ether alcohols. The reaction of the epoxides with compounds bii) and biii) can also take place in one step, for example, according to the processes of DE-OS 2,429,527 and DE-A 2,534,012 (which correspond to U.S. Pat. Nos. 4,253,198 and 4,081,492, respectively, both of which are herein incorporated by reference), optionally in the presence of solvent. Suitable solvents include inert solvents such as butyl acetate, toluene, cyclohexane and mixtures thereof. If desired components bii) and biii) can be reacted before being reacted with the epoxide group-containing compound (see U.S. Pat. No. 5,726,255 and U.S. reissue Pat. No. 37,448). The reaction is generally carried out in the presence of about 0.01 to 3 wt. %, based on the epoxide, of catalysts such as tertiary amines, quaternary ammonium salts, alkali hydroxides, alkali salts of organic carboxylic acids, mercaptans, dialkyl sulphides, sulphonium or phosphonium compounds and phosphines. The use of quaternary ammonium salts such as triethylbenzylammonium chloride is particularly preferred. The reaction takes place at 20 to 120° C., preferably 40 to 90° C.

The epoxy(meth)acrylates may optionally be modified with basic nitrogen compounds in a amount sufficient to provide up to 0.3 NH equivalents per epoxide equivalent. The modification reaction may be carried out before or after the epoxide reaction with components bii) and biii). Suitable basic nitrogen compounds include ammonia, (cyclo)aliphatic primary or secondary mono- or polyamines, preferably having a molecular weight of 31 to 300. Examples of primary amines include mono- and diamines such as methylamine, n-butylamine, n-hexylamine, 2-ethylhexylamine, cyclohexylamine, ethanolamine, benzylamine, ethylene diamine, the isomeric diaminobutanes, the isomeric diaminohexanes and 1,4-diaminocyclohexane. Examples of secondary amines include dimethylamine, diethylamine, diethanolamine, diisopropanolamine, N-methylethanolamine and N-cyclohexylisopropylamine.

The reaction of the epoxide groups with the nitrogen compounds may optionally take place in the presence solvents such as those previously set forth. The reaction is preferably carried out in the absence of solvent. The reaction temperature is 20 to 120° C., preferably 40 to 90° C.

The quantities of starting compounds are chosen such that the reaction leads to essentially complete conversion of the epoxide groups originally present. In order to protect the polymerizable reaction products according to the invention from unwanted premature polymerization, it is advisable to add, during the preparation process, 0.001 to 0.2 wt. %, based on the total reaction mixture including auxiliaries and additives, of polymerization inhibitors or antioxidants, such as phenols and phenol derivatives, preferably sterically hindered phenols. Other suitable stabilizers are described in "Methodender organischen Chemie" (Houben-Weyl), 4th edition, vol. XIV/1, page 433-452, 756, Georg Thieme Verlag, Stuttgart, 1961, and include 2,6-di-tert.-butyl-p.-cresol, hydroquinone monomethylether and/or phenothiazine.

Component C

Component C), the photoinitiator, can be substantially any photoinitiator. A variety of photoinitiators can be utilized in the radiation-curing compositions of the present invention. The usual photoinitiators are the type that generate free radicals when exposed to radiation energy. Suitable photoinitiators include, for example, aromatic ketone compounds, such as benzophenones, alkylbenzophenones, Michler's ketone, anthrone halogenated benzophenones. Further suitable compounds include, for example, 2,4,6-trimethylbenzoyldiphenylphosphine oxide, phenylglyoxylic acid esters, anthraquinone and the derivatives thereof, benzil ketals and hydroxyalkylphenones. Illustrative of additional suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene 9,10-dichloroanthracene; 4,4-dichlorobenzophenone; thioxanthone; isopropyl-thioxanthone; methylthioxanthone; α,α, α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; maleimides and their derivatives; and mixtures thereof. There are several suitable photoinitiators commercially available from Ciba including Irgacure 184 (1-hydroxy-cyclohexyl-phenyl-ketone), Irgacure 819 (bis(2,4,6-trimethylbenzoyl)-phenylphosphineoxide), Irgacure 1850 (a 50/50 mixture of bis(2,6-dimethoxybenzoyl)-2,4,4-trimethylpentyl-phosphine oxide and 1-hydroxy-cyclohexyl-phenyl-ketone), Irgacure 1700 (a 25/75 mixture of bis(2,6-dimethoxybenzoyl)-2,4,4-trimethylpentyl-phosphine oxide and 2-hydroxy-2-methyl-1-phenyl-propan-1-one), Irgacure 907 (2-methyl-1 [4-(methylthio)phenyl]-2-morpholonopropan-1-one), Darocur MBF (a phenyl glyoxylic acid methyl ester), Irgacure 2020 Photoinitiator blend (20% by weight of phenylbis(2,3,6-trimethyl benzoyl) phosphine oxide and 80% by weight of 2-hydroxy-2-methyl-1-phenyl-1-propanone) and Darocur 4265 (a 50/50 mixture of bis(2,4,6-trimethylbenzoyl)-phenylphosphineoxide and 2-hydroxy-2-methyl-1-phenyl-propan-1-one). The foregoing lists are meant to be illustrative only and are not meant to exclude any suitable photoinitiators. Those skilled in the art will know the concentrations at which photoinitiators are effectively employed and generally the concentration will not exceed about 10% by weight of the radiation-curable coating composition.

Those skilled in the art of photochemistry are fully aware that photoactivators can be used in combination with the aforementioned photoinitiators and that synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxypropane, and mixtures thereof.

Curing may also take place in the presence of compounds that generate free radicals such as (hydro)peroxides, optionally in the presence of accelerators and cationically in the presence of superacids such as the phenyl sulfonium metal salts.

Component D

The compositions of the present invention can also contain one or more solvents in an amount of from 0 to about 90% by weight, where the % by weight is based on the total combined amounts of components A) and B). The solvent must be inert with any of the other components. Useful solvents include $C_5$-$C_8$ aliphatic and cycloaliphatic compounds, fluorinated and/or chlorinated hydrocarbons, aliphatic esters, aliphatic ethers and ketones and known aromatic solvents. Specific examples of useful solvents include ethyl acetate, butyl acetate, toluene, hexane, heptane, cyclohexane, acetone, methyl ethyl ketone, methyl isobutyl ketone, methyl n-amyl ketone, isopropanol, ethylene glycol monobutyl ether, diethylene glycol monobutyl ether and solvent naptha. The formulations with or without solvents can also be loaded into aerosol containers.

Other Additives

As is known in the art and depending on the application for the coating, additional additives can be used. Such additives include dispersing agents, flow aid agents, thickening agents, defoaming agents, deaerating agents, pigments, fillers, flattening agents and wetting agents. In addition, where the article to be coated is of such a shape that portions of the coating may not be exposed to radiation, it is possible to add materials which crosslink through carboxyl, hydroxyl, amino groups or moisture. Such materials include carbodiimides, aziridines, polyvalent cations, melamine/formaldehyde, epoxies, and isocyanates. When used, such crosslinkers should be used in an amount of from 0.1 to 35% by weight based on the combined weight of components A) and B)

Applying and Curing

Generally, components A) and B) are first mixed together and then component C) and any other additives are added thereto. The composition of the invention may be applied onto the most varied substrates by spraying, rolling, knife-coating, pouring, brushing, dipping, putty knife or squeegee. Any solvent present may be then flashed off by baking in a conventional oven at a temperature of from about 20 to about 11° C. preferably from about 35 to about 60° C. for a period of from about 1 to about 10 minutes preferably from about 4 to 8 minutes. The solvent can also be flashed off using radiation sources like infra-red or microwave.

Once the solvent has baked off, the coated substrate is subjected to UV radiation having a wavelength of at least 300 nm and preferably radiation having wavelength of from about 320 to about 450 nm. The distance between the surface and the radiation source will depend upon the intensity of the light source and should generally be no more than four feet. The length of time the coated substrate is subjected to the radiation will depend on the intensity and wavelength of the radiation, the distance from the radiation sources, solvent content in the formulation, temperature and the humidity of the cure surroundings but will generally be less than 15 minutes and may be as short as 0.1 second.

The cured coatings are distinguished by their sandability.

As noted above, the compositions are curable using radiation sources having wavelengths of at least 300 nm and preferably from about 320 to about 450 nm. The radiation can be provided by any suitable source such as UV lamps having with or reduced infrared emission or UV lamps fitted with filters to eliminate infrared emissions or so-called LEDs (light-emitting devices) emitting radiation in the wavelength noted. Particularly useful commercially available devices include: the Panacol UV H-254 lamp (available from Panacol-Elosol GmbH)—a 250 W ozone-free, iron doped metal halide lamp with spectral wavelength of from 320 to 450 nm; Panacol UVF-450 (320 nm to 450 nm depending on the black, blue or clear filter used); Honle UVA HAND 250 CUL (available from Honle UV America Inc)—emitting maximum intensity UVA range of ~320 to 390 nm; PMP 250 watt metal halide lamp (available from Pro Motor Car Products Inc); Cure-Tek UVA-400 (available from H&S Autoshot) which has a 400-watt metal halide bulb and the lamp assembly can be fitted with different filters like blue, light blue or clear to control/eliminate the infra-red radiation from the lamp source); Con-Trol-Cure Scarab-250 UV-A shop lamp system (available from UV Process Supply Inc—has a 250 W iron doped metal halide lamp with a spectral wavelength output of 320 to 450 nm); Con-Trol-Cure—UV LED Cure-All 415 (available from UV Process Supply Inc.—spectral wavelength of 415 nm with a 2.5 to 7.95 W operating wattage range); Con-Trol-Cure—UV LED Cure-All 390 (available from UV Process Supply Inc.— spectral wavelength of 390 nm with a 2.76 to 9.28 W operating wattage range); UV H253 UV lamp (available from UV Light Technologies—the unit contained a 250 W iron doped metal halide lamp fitted with a black glass filter to produce a spectral wavelength of between 300 and 400 nm); Radion RX10 module curing using solid state high intensity UV light source from Phoseon Technology; Low intensity microwave UV System Model QUANT-18/36 (available from Quantum Technologies—UV Intensity range: 3-30 mW/cm2; UV Spectral range: 330-390 nm); WorkLED (available from Inretech Technologies using 400 nm LED arrays); Flashlight MC with 20×LED adapter (available from Inretech Technologies using 400 nm LEDs); and Phillips TL03 lamp with radiation output above 380 nm.

The examples that follow are intended to illustrate the invention without restricting its scope. Unless otherwise indicated, all percentages and parts are by weight.

In the examples, the following materials were used:
$TiO_2$—$TiO_2$ R-960, available from DuPont
Tronox-A—Untreated anatase pigment available from Kerr-McGee Pigments GmbH & Co.
Epon 828—Aromatic epoxy resin based on bisphenol-A and epichlorohydrin with epoxy equivalent weight of 190 available from Resolution Performance Products
Desmodur N3600—Low viscosity Hexamethylene Diisocyanate trimer available from Bayer MaterialScience LLC
Barytes1—Sparmite No. 1 Barytes—Extender pigment barium sulphate from Elementis Pigments, Inc.
CC—calcium carbonate, Vicron 15-15, available from Whittaker, Clark & Daniels, Inc.
T399—Talc 399, available from Whittaker, Clark & Daniels, Inc.
B318—an iron oxide pigment available as Bayferrox 318M from Bayer Chemical Corporation
CD9052—Trifunctional acid ester adhesion promoter from Sartomer Inc.
IRG2020—Photoinitiator Blend {20% by weight of Phenyl bis (2,4,6-trimethyl benzoyl) phosphine oxide (I819) and 80% by weight of 2-Hydroxy-2-methyl-1-phenyl-1-propanone (D1173)} from Ciba Specialty Chemicals
IRG819—Irgacure 819 photoinitiator, {Phenyl bis (2,4,6-trimethyl benzoyl) phosphine oxide} available from Ciba Specialty Chemicals Unsaturated Acrylate Polymer A1:
Step 1: 86 parts of a polyether polyol with hydroxyl number 250 (trimethylol propane ethoxylated 12 times), 18.7 parts of Acrylic acid, 1.5 parts of p-toluenesulphonic acid, 0.3 parts of p-methoxyphenol and 0.02 parts of 2,5-di-tert.-butylhydroquinone were dissolved to form a 70% solution in cyclohexane, and heated to the reflux temperature while stirring and passing air through. The mixture was kept under a strong reflux until an acid number of less than 5 mg KOH/g of solids was obtained. After the mixture had cooled to 50° C., a vacuum was applied and the cyclohexane along with the water formed was distilled off. The unsaturated polyether acrylate polyol (OH number of about 70) formed is used in the next stage to form the Urethane Acrylate.

Step 2: 70 parts of unsaturated polyether acrylate polyol made using Step1, 10.5 parts of hydroxy ethylacrylate, 20 parts of isophorone diisocyanate were mixed together along with and 0.01 parts of dibutyltin dilaurate and 0.01 parts of p-methoxy phenol (polymerization inhibitor). The reaction mixture was stirred at 80° C. by monitoring the NCO groups using IR spectroscopy. When the isocyanate groups are completely consumed, the resultant unsaturated urethane acrylate resin had a viscosity of about 7,000 mPas measured at 23° C. and a C=C content of 2.7 mol/kg.

Unsaturated Acrylate Polymer A2: 1 mole of polyether polyol with hydroxyl number 550 (trimethylol propane ethoxylated 4 times) is reacted with 2.6 moles of Acrylic acid in the presence of 1.5 parts of p-toluenesulphonic acid, 0.3 parts of p-methoxyphenol and 0.02 parts of 2,5-di-tert.-butylhydroquinone in a 70% solution of cyclohexane, and heated to the reflux temperature while stirring and passing air through. The mixture was kept under a strong reflux for about 4 hours until an acid number of less than 5 mg KOH/g of solids was obtained. After the mixture had cooled to 50° C., a vacuum was applied and the cyclohexane along with the water formed was distilled off. The resulting polyether acrylate polyol had a hydroxyl number of 50.

Unsaturated Acrylate Polymer A3: 90.4 parts of an unsaturated polyether acrylate polyol with hydroxyl number of 50, 9.6 parts of isophorone diisocyanate were mixed together along with 0.01 parts of dibutyltin dilaurate and 0.01 parts of p-methoxy phenol (polymerization inhibitor). The reaction mixture was stirred at 80° C. by monitoring the NCO groups using IR spectroscopy. When the isocyanate groups are completely consumed, the resultant unsaturated urethane acrylate resin had a viscosity of about 800 mPas measured at 23° C. and a C=C content of 5.3 mol/kg.

Unsaturated Acrylate Polymer A4: 62.1 parts of Desmodur N3600, 22.8 parts of hydroxy ethylacrylate, 11 parts of hydroxy propylacrylate, 4.1 parts of 2-Ethyl-1,3-hexandiol were mixed together along with and 0.05 parts of dibutyltin dilaurate and 0.1 parts of p-methoxy phenol (polymerization inhibitor) and 25 parts of butyl acetate. The reaction mixture was stirred at 80° C. by monitoring the NCO groups using IR spectroscopy. When the isocyanate groups are completely consumed, the resultant unsaturated urethane acrylate resin had a viscosity of about 6800 cPs measured at 23° C.

Unsaturated Epoxy Acrylate B: 74 parts of Unsaturated Acrylate Polymer A2, 7.1 parts of maleic anhydride, 16.6 parts of Epon 828 with epoxy equivalent weight of 190, 2.5 parts of diethanol amine were mixed together along with and 0.5% of triethylbenzylammonium chloride (epoxy acid catalyst) and 0.01 parts of p-methoxy phenol (polymerization inhibitor). The mixture was heated to 80° C. while stirring and passing air through. The mixture was kept at that temperature until an acid number of <5 mg KOH/g solids was obtained. The 100% solids unsaturated epoxy acrylate resin formed has a viscosity of ~8,000 mPa·s measured at 23° C. and C=C content of 5 mol/kg.

EXAMPLE 1

50 parts by weight of Unsaturated Acrylate Polymer A1, 50 parts by weight of Unsaturated Epoxy Acrylate B and 7.8 parts by weight of IRG819 and were mixed together well. Then 3.4 parts by weight of $TiO_2$, 41.1 parts by weight of CC, 59 parts by weight of extender pigment T399, 0.58 parts by weight of B318M were added slowly to the resin mixture with continued stirring. The solvent-free formulation prepared was kept overnight to de-aerate. The formulation was then applied to a cold rolled steel substrate to a wet film thickness of 3 mils using a squeegee or coatings draw-down bar or using a putty knife.

The panel was cured under a low intensity UV-A light source (Cure-Tek UVA-400 available from H&S Autoshot) for 2 minutes at a 10 inch distance resulted in a tack free surface at a dry film thickness of 1.6 to 2.0 mils. The formulation had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

EXAMPLE 2

50 parts by weight of Unsaturated Acrylate Polymer A1, 50 parts by weight of Unsaturated Epoxy Acrylate B and 7.8 parts by weight of IRG819 and were mixed together well. Then 3.4 parts by weight of $TiO_2$, 41.1 parts by weight of CC, 59 parts by weight of extender pigment T399, 0.58 parts by weight of B318M, 30 parts by weight of adhesion promoter CD9052 were added slowly to the resin mixture with continued stirring. The solvent-free formulation (pigment/binder ratio=0.8) prepared was kept overnight to de-aerate. The formulation was then applied to a cold rolled steel substrate to a wet film thickness of 3 mils using a squeegee or coatings draw-down bar or using a putty knife.

The panel was cured under a low intensity UV-A light source (a Panacol UV H-254 lamp—250 W Ozone Free Iron doped metal halide lamp with spectral wavelength of 320-450 nm) for 2 minutes at a 3 inch distance resulting in a tack free surface at a dry film thickness of 1.6 to 2.0 mils. The same formulation when applied to panels similarly and exposed to a low intensity UV-A light source (Cure-Tek UVA-400 available from H&S Autoshot) for 2 minutes at a 10 inch distance resulted in a tack free surface. The formulation had excellent adhesion to cold rolled steel as measured by crosshatch test (ASTM D3359-95 and General Motors GM 9071P Tape Adhesion Tests). The coating could be sanded with #320 grit sandpaper and base coated immediately right after curing. It exhibited excellent hiding.

EXAMPLE 3

The same formulation used in Example 2 was applied in the same manner to a cold rolled steel substrate. The wet coating was then exposed to radiation from a LED source at ¼ inch distance using a Con-Trol-Cure—UV LED Cure-All 415 device or a or Con-Trol-Cure—UV LED Cure-All™ 100 array (spectral wavelength of 390 nm). A tack free surface with good solvent resistance resulted. The details are shown in Table 1. The primer had excellent adhesion to cold rolled steel as measured by crosshatch test (ASTM D3359-95 and General Motors GM 9071 P Tape Adhesion Tests).

The coating could be sanded with #320 grit sandpaper and base coated immediately right after curing. It exhibited excellent hiding.

TABLE 1

LED radiation curable pigmented primer

| Test Results Radiation Source | Formulation from Example 1 Time\Distance | MEK Double Rubs |
|---|---|---|
| 415 C-T -C | 1 second\¼ inch | >100 |
| C-T-C 390 array | 2 min.\6 inch | 1 |
| " | 2 min.\5 inch | 17 |
| " | 2 min.\4 inch | >100 |

EXAMPLE 4

The same formulation used in Example 2 was diluted using 60 parts of butyl acetate as solvent. The formulation was then applied to a cold rolled steel substrate by spraying with a Binks Model#2001 air-type siphon gun (air pressure 38-40 psi) to a wet film thickness of 4 mils. The sprayed panels were air dried at room temperature for 4 minutes and then cured under a low intensity UV-A light source (a Panacol UV H-254 lamp—250 W Ozone Free Iron doped metal halide lamp with spectral wavelength of 320-450 nm) for 2 minutes at a 3 inch distance resulting in a tack free surface with a dry film thickness of 1.2 to 1.5 mils. The sprayed panels also cured under a low intensity UV-A light source (Cure-Tek UVA-400 available from H&S Autoshot) when exposed for 2 minutes at a 10 inch distance resulting in a dry film thickness of 1.2 to 1.5 mils. The formulations had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

The sprayed panels were prebaked in a conventional hot air oven at 50° C. for 8 minutes and were then exposed to radiation from LED source at ¼ inch distance using a Con-Trol-Cure—UV LED Cure-All 415 device. A tack free surface with good solvent resistance resulted in less than one minute. The primer had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

EXAMPLE 5

50 parts by weight of Unsaturated Acrylate Polymer A1 and 50 parts by weight of Unsaturated Epoxy Acrylate B were mixed together, and 5 parts by weight of T-TIO$_2$, 25 parts by weight of extender pigment T399, 132 parts by weight of Barytes#1, 1.0 parts by weight of B318M, 10 parts by weight of adhesion promoter CD9052 were added slowly to the resin mixture with continued stirring. 4.4 parts by weight of IRG819 was dissolved in 58.45 parts by weight of butylacetate separately and added to the dispersion mixture and stirred well. This solvent-based formulation (pigment/binder ratio=1.5) prepared was kept overnight to de-aerate. The formulation was then applied to a cold rolled steel substrate by spraying with a Binks Model#2001 air-type siphon gun (air pressure 38-40 psi) to a wet film thickness of 3 mils.

The formulation was cured under a low intensity UV-A light source (a Panacol UV H-254 lamp—250 W Ozone Free Iron doped metal halide lamp with spectral wavelength of 320-450 nm) for 2 minutes at a 3 inch distance at a dry film thickness of 1.0 to 1.2 mils resulting in a tack free surface. It had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

EXAMPLE 6

50 parts by weight of Unsaturated Acrylate Polymer A1 and 50 parts by weight of Unsaturated Epoxy Acrylate B were mixed together. 6 parts by weight of IRG819 were added slowly to the resin mixture with continued stirring. The formulation prepared was kept overnight to de-aerate. This clear formulation was then applied to a wood substrate by spraying with a Binks Model#2001 air-type siphon gun (air pressure 38-40 psi) to a wet film thickness of 2 mils.

Curing the coating under a low intensity Panacol UVA 400 lamp at 10 inch distance for 8 minutes resulted in a coating with high pendulum hardness (dry film thickness of 0.9 to 1.2 mils). It had excellent adhesion to wood substrate as measured by crosshatch test (ASTM D3359-95 and General Motors GM 9071 P Tape Adhesion Tests). The coating could be sanded with #320 grit sandpaper and top coated immediately right after curing. It had good solvent resistance and excellent block resistance.

Block resistance test was conducted as follows: the test was performed 1 hour after curing the coating. A 1"×1" square of cheesecloth was placed on surface of coating. 2 Lbs./per square inch of force was then applied to the cheesecloth by placing weight on it. After 24 hours the weight and cheesecloth were removed and the coating surface was observed for any defects/changes.

EXAMPLE 7

50 parts by weight of Unsaturated Acrylate Polymer A1 and 50 parts by weight of Unsaturated Epoxy Acrylate B were mixed together. 30 parts by weight of adhesion promoter CD9052 and 7.8 parts by weight of IRG819 were added slowly to the resin mixture with continued stirring. The formulation prepared was kept overnight to de-aerate. This clear formulation was then applied to a wood substrate by spraying with a Binks Model#2001 air-type siphon gun (air pressure 38-40 psi) to a wet film thickness of 2 mils.

Curing the coating under a low intensity Panacol UV H-254 lamp at 10 inch distance for 8 minutes resulted in a coating with high pendulum hardness (dry film thickness of 0.9 to 1.2 mils). It had excellent adhesion to wood substrate as measured by crosshatch test (ASTM D3359-95 and General Motors GM 9071 P Tape Adhesion Tests). The coating could be sanded with #320 grit sandpaper and top coated immediately right after curing. It had good solvent resistance and excellent block resistance.

EXAMPLE 8

The same formulation used in Example 7 was applied in the same manner described in Example 7 to a cold rolled steel substrate followed by exposure to radiation from an LED source at ¼ inch distance using a Con-Trol-Cure—UV LED Cure-All™ 415 device. The details of exposure time are shown in Table 2. A tack-free surface with good solvent resistance resulted in each instance. The coating could be sanded with #320 grit sandpaper and base coated right after curing.

TABLE 2

LED radiation curable clear sealer

| Test Results Radiation Source | Formulation from Example 1 Time\Distance | MEK Double Rubs |
|---|---|---|
| 415 C-T -C | 1 second\¼ inch | 37 |
| " | 3 second\¼ inch | 80 |
| " | 4 second\¼ inch | 100 |
| " | 5 second\¼ inch | 100 |

EXAMPLE 9

50 parts by weight of Unsaturated Acrylate Polymer A2, 50 parts by weight of Unsaturated Epoxy Acrylate B and 7.8 parts by weight of IRG819 and were mixed together well. Then 3.4 parts by weight of $TiO_2$, 41.1 parts by weight of CC, 59 parts by weight of extender pigment T399, 0.58 parts by weight of B318M were added slowly to the resin mixture with continued stirring. The solvent-free formulation prepared was kept overnight to de-aerate. The formulation was then applied to a cold rolled steel substrate to a wet film thickness of 6 mils using a squeegee or coatings draw-down bar or using a putty knife.

The formulation was cured under a low intensity UV-A light source (a H&S Autoshot UVA 400 lamp (with spectral wavelength of 320-450 nm) for 2 minutes at a 3 inch distance at a dry film thickness of 1.6 to 2.0 mils resulting in a tack free surface. It had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

EXAMPLE 10

50 parts by weight of Unsaturated Acrylate Polymer A3, 50 parts by weight of Unsaturated Epoxy Acrylate B and 7.8 parts by weight of IRG819 and were mixed together well. Then 3.4 parts by weight of $TiO_2$, 41.1 parts by weight of CC, 59 parts by weight of extender pigment T399, 0.58 parts by weight of B318M were added slowly to the resin mixture with continued stirring. The solvent-free formulation prepared was kept overnight to de-aerate. The formulation was then applied to a cold rolled steel substrate to a wet film thickness of 3 mils using a squeegee or coatings draw-down bar or using a putty knife.

The formulation was cured under a low intensity UV-A light source (a H&S Autoshot UVA 400 lamp (with spectral wavelength of 320-450 nm) for 2 minutes at a 3 inch distance at a dry film thickness of 1.6 to 2.0 mils resulting in a tack free surface. It had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

EXAMPLE 11

50 parts by weight of Unsaturated Acrylate Polymer A4, 50 parts by weight of Unsaturated Epoxy Acrylate B and 7.8 parts by weight of IRG819 and were mixed together well. Then 3.4 parts by weight of $TiO_2$, 41.1 parts by weight of CC, 59 parts by weight of extender pigment T399, 0.58 parts by weight of B318M were added slowly to the resin mixture with continued stirring. The solvent-free formulation prepared was kept overnight to de-aerate. The formulation was then applied to a cold rolled steel substrate to a wet film thickness of 3 mils using a squeegee or coatings draw-down bar or using a putty knife.

The formulation was cured under a low intensity UV-A light source (a H&S Autoshot UVA 400 lamp (with spectral wavelength of 320-450 nm) for 2 minutes at a 3 inch distance at a dry film thickness of 1.6 to 2.0 mils resulting in a tack free surface. It had excellent adhesion to cold rolled steel as measured by crosshatch test (ASTM D3359-95 and General Motors GM 9071 P Tape Adhesion Tests). The coating could be sanded with #320 grit sandpaper and base coated immediately right after curing. It exhibited excellent hiding.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A non-aqueous composition, which contains no ethylenically unsaturated monomer, and which comprises
    A) from about 1 to about 99% by weight of an unsaturated (meth)acrylate polymer or oligomer selected from the group consisting of:
        a) an unsaturated urethane (meth)acrylate polymer or oligomer, which has an isocyanate group content of 1% by weight or less and is prepared by reacting:
            ai) one or more organic polyisocyanates, and
            aii) an unsaturated (meth)acrylate selected from the group consisting of
                1) from 0 to 100% by weight of an unsaturated polyether (meth)acrylate polyol having an OH number of from about 30 to about 500, and prepared by reacting an aliphatic polyether di- or polyol with acrylic and/or methacrylic acid, and
                2) from 0 to about 100% by weight of a mono-, di-, tri- or poly-hydroxyl-$C_1$-$C_{10}$-alkyl or $C_6$-$C_{10}$-aryl (meth)acrylate, wherein the percents by weight of components aii)1) and aii)2) are based on the total weight of components aii)1) and aii)2 and total 100%,
            at an isocyanate to hydroxyl equivalent ratio of from about 0.95:1 to about 1:0.95,
        b) an unsaturated polyether (meth)acrylate polyol having an OH number of from about 30 to about 100, and prepared by reacting a polyether di- or polyol with acrylic and/or methacrylic acid, and
        c) mixtures thereof,
    B) from about 1 to about 99% by weight of an unsaturated epoxy (meth)acrylate which is substantially free from epoxide groups and is prepared by reacting
        bi) one or more organic compounds containing at least one epoxide group and having a number average molecular weight of from about 130 to about 1000,
        bii) from 1.3 to 3.0 carboxy equivalents of organic dicarboxylic acid or anhydride having a number average molecular weight of from about 98 to about 166, biii) 1 hydroxy equivalent of an hydroxyl group containing reaction product, prepared at a carboxy to hydroxyl equivalent ratio of from 0.6:1 to 0.95:1 of
1) (meth)acrylic acid and
2) tri- or tetrahydroxy ether alcohols having a number average molecular weight of from about 180 to about 1000 and containing at least two ethylene and/or propylene oxide units as part of an ether structure, with the ratio of reactive equivalents of components bii) through biii) to epoxide equivalents of component bi) being at least about 1:1, C) from about 0.1 to about 10% by weight of one or more photoinitiators, wherein the % by weight of component C) is based on the combined weight of components A) and B) and wherein the percentages of components A) and B) total 100%, and D) from 0 to about 90% by weight of solvent or a mixture of solvents, wherein the % by weight of component D) is based on the total combined amount of components A) and B).

2. The composition of claim 1 comprising from about 10 to about 90% by weight of component A), from about 10 to about 90% by weight of component B), and from about 0.5 to about 6% by weight of component C).

3. The composition of claim 1 comprising from about 25 to about 75% by weight of component A), from about 25 to about 75% by weight of component B), and from about 1 to about 4% by weight of component C).

4. The composition of claim 1, wherein component aii)1) has an OH number of from about 100 to about 400.

5. The composition of claim 4, wherein component aii)1) has an OH number of from about 200 to about 300.

6. The composition of claim 1 wherein the isocyanate to hydroxyl equivalent is about 1:1.

7. The composition of claim 1, wherein the OH number of component A)b) is from about 30 to about 70.

8. The composition of claim 7, wherein the OH number of component A)b) is from about 35 to about 65.

9. The composition of claim 1, wherein from about 1.8 to about 2.2 carboxy equivalents of organic dicarboxylic acid or anhydride (component bii)) are reacted.

10. The composition of claim 9, wherein from about 1.9 to about 2.1 carboxy equivalents of organic dicarboxylic acid or anhydride (component bii)) are reacted.

11. The composition of claim 1, wherein component bi) contains an average of from 1.5 to 6 epoxide groups per molecule.

12. The composition of claim 11, wherein component bi) contains an average of from 1.5 to 2 epoxide groups per molecule.

13. The composition of claim 1, wherein the carboxy to hydroxyl equivalent ratio (component biii)) is form 0.65:1 to 0.9:1.

14. In a method of preparing a coated substrate by first applying a coating composition to said substrate and then subjecting the resultant coated substrate to radiation, the improvement wherein said composition is the composition of claim 1 and wherein the radiation has a wavelength of 300 nm or more.

15. A coated substrate prepared by the method of claim 14.

* * * * *